Oct. 5, 1954     F. LEISTER     2,690,937

BEARING LOCKING COLLAR

Filed June 21, 1950

Inventor
FAYETTE LEISTER
Mitchell Bechert
Attorneys

Patented Oct. 5, 1954

2,690,937

UNITED STATES PATENT OFFICE 2,690,937

BEARING LOCKING COLLAR

Fayette Leister, New Britain, Conn., assignor to
The Fafnir Bearing Company, New Britain,
Conn., a corporation of Connecticut Application June 21, 1950, Serial No. 169,446

4 Claims. (Cl. 308—187.1)

My invention relates to locking means for securely anchoring an inner bearing ring or the like to a shaft.

It is an object of the invention to provide an improved means of the character indicated.

It is another object to provide a simplified locking ring for engagement with an eccentric locking surface on an inner bearing ring or the like to anchor the same to a shaft upon relative rotation.

It is a further object to provide locking means of the character indicated wherein the locking ring may serve as a flinger in cooperation with the bearing to which it is applied.

It is a general object to meet the above objects with simple and easily fabricated constructions inherently capable of standing high stresses and of producing a secure self-locking bind upon a shaft.

It is also an object to provide an improved self-locking means of the character indicated wherein once a bind has been set up there may be a minimum of difficulty in releasing the bind so as to release the bearing or the like from the shaft.

Other objects and various further features of novelty and invention will be pointed out or will occur to those skilled in the art from a reading of the following specification in conjunction with the accompanying drawings. In said drawings, which show, for illustrative purposes only, preferred forms of the invention:

Briefly stated, my invention contemplates an improved self-locking means for application to an eccentrically formed end of an inner bearing ring, collar, or the like to be secured to a shaft. The locking means may comprise an annular or ring member including two diametrically opposed axially offset segments. The inner contour of one segment may be formed to engage and grip the eccentrically formed surface at the end of the ring, while the inner contour of the other segment may be formed for a similar secure grip upon the shaft. Upon relative rotation of the shaft and of the inner bearing ring in either direction, the nature of the engagement between the locking ring and the shaft and the inner bearing ring may be such as to produce self-tightening.

In one form to be described, the locking ring may be formed of sheet material with axial offsets at generally diametrically opposed points as to define two generally semi-circular segments. In another form, the ring may be of wire, appropriately formed with the desired inner contour and axial offsets. In still another form, the locking ring may be formed as part of a flinger member to cooperate with a bearing and to serve the purpose and function of a flinger.

Figure 1:
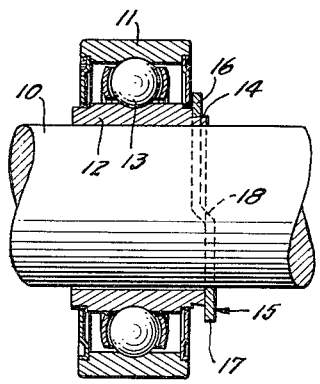
Fig. 1 is a longitudinal sectional view of an antifriction bearing, the inner ring of which is about to be locked upon a shaft by means incorporating features of the invention.
Figures 2, 3:
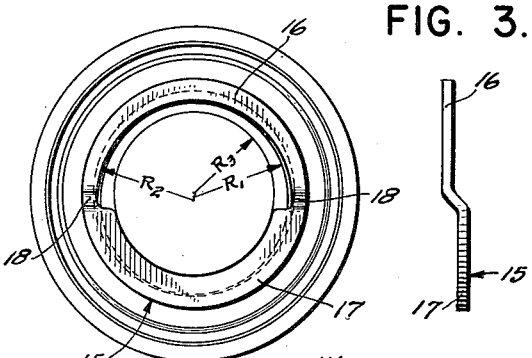
Fig. 2 is a right-end view of the assembly of Fig. 1.
Fig. 3 is a side eleavtion of the locking ring employed in Figs. 1 and 2.

Referring to Figs. 1, 2, and 3 of the drawings, my invention is shown in application to the locking of an antifriction bearing to a shaft 10. The bearing may include an outer ring 11 and an inner ring 12 spaced by a plurality of antifriction elements 13. One axial end of the inner bearing ring 12 may be provided with an eccentrically generated locking surface 14. The locking surface 14 may be generally right-cylindrical about an axis eccentric to the axis of the bore of the inner ring 12; however, in the preferred form shown, the locking surface 14 is slightly tapered toward the main body of the inner bearing ring, so as to provide an axial-retaining function which will later be apparent.

In order to clamp the inner bearing ring 12 upon the shaft 10, I may employ a circumferentially extending locking ring 15 which may be circumferentially continuous and generally annular. The ring 15 may comprise essentially two axially offset diametrically opposite segments 16-17, and in the form shown both segments 16-17 are substantially semicircular and are offset axially from one another at substantially diametrically opposed locations 18. The outer contour of the ring 15 may be of any desired shape, but I prefer, for appearance's sake, that the outer contour shall be circular, centered generally on the axis of the bore of the inner ring and, therefore, substantially on the shaft axis. The inner contour of both segments 16-17 may be of any desired shape, but the minimum radial spacing of the inner contour of segment 16 should be such with respect to the minimum radial spacing of the inner contour of the segment 17 that the segment 16 may be axially inserted over the point of minimum rise of the eccentric locking surface 14 and over the shaft.

In a preferred form, the contours of the two segments 16-17 are generally arcuate, and, of course, since the segment 16 is to engage a surface of larger radius than is the segment 17, the inner contour of the segment 16 should be larger in radius than the inner contour of the segment 17. For a secure bind, the radius of one of these inner surfaces should be larger than the radius of the surface which it is engaging, and in the form shown in Figs. 1 to 3 (as illustrated in Fig. 2) the inner radius $R_2$ of the segment 16 is larger than the radius $R_1$ of the eccentric locking surface 14, and the center of the inner contour of segment 16 may be said to overlap the center of the inner contour of segment 17. With such construction, it will be appreciated that with the exception of the location of the bind between segment 16 and the locking surface 14, all remaining parts of the inner surface of segment 16 may safely clear more radially offset points of the eccentric locking surface 14 so that, regardless of the relative rotation necessary to establish the desired self-locking binding, there may never be any impairment of the ability of ring 15 securely to lock against the ring 12.

Figure 4:
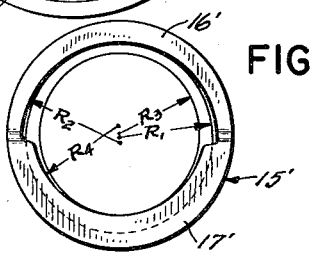
Fig. 4 is an end view of a modified locking ring, mounted on an inner bearing ring and suitable for use as shown in Fig. 1.

In Fig. 4, I show a slightly modified arrangement of the ring of Figs. 1 to 3. The ring 15' of Fig. 4 may closely resemble the ring of Fig. 2. The ring 15' may thus be made of sheet material and be formed into essentially two axially offset segments 16'-17'. As in the case of the segment 16 to engage the locking surface 14 (radius $R_1$), the inner contour of offset segment 16' may be arcuate and of a radius $R_2$. However, the contacting surfaces on the shaft 10 and segment 17' may also diverge; thus, the radius $R_4$ of the inner contour of segment 17' may exceed the radius $R_3$ of the shaft or of the bearing-ring bore. With such construction, it will be appreciated that surfaces diverge at both diametrically opposite points of contact, so that sticky binds may be set up on the one hand between bearing ring 12 and locking ring 15', and on the other hand between locking ring 15' and the shaft 10.

Figure 5:
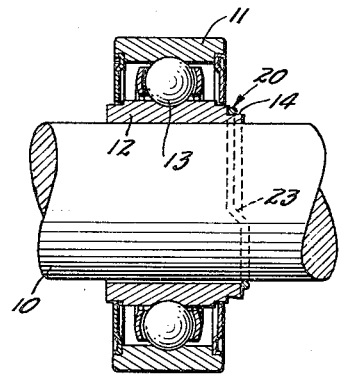
Fig. 5 is a longitudinal sectional view of another antifriction bearing, about to be locked to a shaft by further modified locking means.
Figure 6:
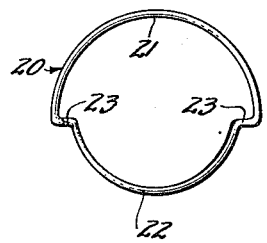
Fig. 6 is an end view of the locking means of Fig. 5.

In Figs. 5 and 6, I show a modified arrangement embodying the principles of the locking ring already described but in which the locking ring is made up of a continuous wire 20 having a contour so as to define effective inner surfaces conforming generally with those described in connection with Figs. 2 and 4. Thus, the ring 20 may comprise two diametrically opposed generally arcuate segments 21-22 offset from one another in an axial direction at generally diametrically opposite locations 23. The segment 22 may be formed of a radius to provide a secure bind on the shaft 10, and the radius of the segment 21 may be formed to provide a secure bind on the locking surface 14. It will be clear that the offsets 23 may not only be generally axially directed (as shown in Fig. 5) but also generally radially directed (as shown in Fig. 6). Such offsets will be understood to provide desired non-fouling clearance with the eccentric surface 14 for all points on said surface 14 more radially offset than the point where the binding engagement with segment 21 is produced.

Figure 7:
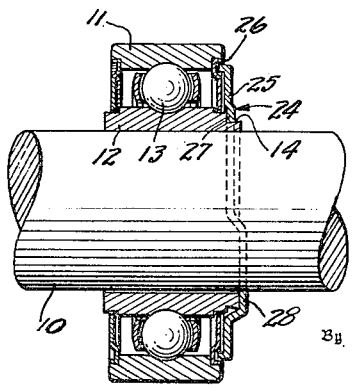
Fig. 7 is a longitudinal sectional view of an antifriction ring locked to a shaft by locking means representing a further modification of the invention.
Figure 8:
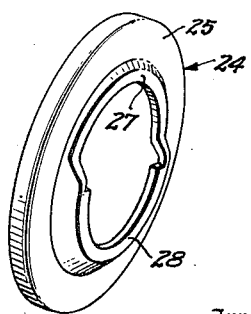
Fig. 8 is a perspective view of the locking means of Fig. 7.

In Figs. 7 and 8, I show a further modification wherein flinger features are incorporated in the locking means. The locking means may be stamped out of sheet material to provide a continuous annular flinger member 25 so formed as to be positioned in close axial relation with a bearing seal member 26 and to provide uniform circumferentially extending protection. However, at the bore or opening of the locking member 24 there may be a first segment or portion 27 of inner contour to produce a bind on the locking surface 14 of the inner bearing ring. The locking means 24 may also include a further segmental portion 28 axially offset from the segmental portion 27 and having an inner contour to produce a bind upon the shaft 10. The segmental portion 27 may be in the same plane as the flinger portion 25; however, in the form shown, segmental portion 27 is slightly axially offset from the flinger portion 25 so that there may be a relatively close axial clearance between the bearing seal member 26 and the flinger portion 25. Thus, the segment 27 which engages the eccentric locking surface 14 may be said to be axially proximate to the plane of the flinger 25 while the segmental portion 28 which is to bind upon the shaft 10 may be said to be axially remote from the general plane of the flinger 25.

It will be seen that I have described relatively simple locking-ring constructions for producing self-locking engagement with an eccentric locking surface on an inner bearing ring or the like. My constructions are characterized by extreme simplicity whether made from sheet material or from wire stock, and yet gripping efficiency and strength may be of the highest, because the constructions lend themselves to employment of high strength materials. My constructions are such as to provide minimum overall axial length of a locked ring on a shaft, and, since the locking ring is so simple and inexpensive to manufacture, no harm is done in breaking the locking ring in a snipping or cutting operation when necessary in order to free the bearing ring from the shaft. It will be appreciated that the flaring or tapering nature of the eccentric locking surface 14 may provide an inward locking effect, tending to retain the locking ring against axial dislodgment from the inner bearing ring 12 so that, even though the locking ring may be momentarily disengaged upon a reversed rotation of the bearing relatively to the shaft, there may be no loss of the locking ring during the interval prior to binding on the other side of the eccentric locking surface 14.

While I have described my invention in detail for the preferred forms shown, it will be understood that modifications may be made within the scope of the invention as defined in the appended claims.

I claim:

1. In a locking means for locking a bearing ring or the like to a shaft, said ring having an axial bore to fit the shaft, said ring having at one end an outer surface eccentric to the bore therein, and a locking member of uniform-thickness material comprising essentially only two diametrically opposed generally arcuate portions contiguously joined to each other at opposed axial offsets at the ends of each of said arcute portions, whereby one of said arcuate portions may by virtue of said offsets extend over the outer eccentric surface while the other of said arcuate portions may fit the shaft and rest against the end of the bearing ring.

2. Locking means according to claim 1, in which said member is of sheet material, said arcuate portions being thin-edge surfaces of said member.

3. Locking means according to claim 1, in which said member is of wire.

4. In combination, a bearing comprising inner and outer bearing rings with antifriction elements therebetween, said inner ring having a bore to fit a shaft and having at one end an outer surface eccentric to the bore, and a locking ring of substantially uniform-thickness material comprising two diametrically opposed arcuate portions contiguously joined to each other at opposed axial offsets at the ends of each of said arcuate portions, whereby one of said arcuate portions may by virtue of said offsets extend over the outer eccentric surface while the other of said arcuate portions may fit the shaft and rest against the end of the bearing ring, said locking ring having integrally formed therewith a radially outwardly extending peripheral flange extending radially outwardly into overlapping relation with a circumferentially extending part of said outer bearing ring, whereby said flange may serve as a centrifugal flinger when said inner bearing ring and said locking ring are rotated.

References Cited in the file of this patent

UNITED STATES PATENTS

| Number | Name | Date |
|---|---|---|
| 827,267 | Schmidt | July 31, 1906 |
| 1,010,391 | Lambie et al. | Nov. 28, 1911 |
| 1,638,747 | Runge | Aug. 9, 1927 |
| 1,664,890 | Krejci | Apr. 3, 1928 |
| 1,821,877 | Bowne | Sept. 1, 1931 |
| 1,909,230 | Smith | May 16, 1933 |
| 2,273,379 | Searles | Feb. 17, 1942 |
| 2,392,242 | Goepfrich | Jan. 1, 1946 |

FOREIGN PATENTS

| Number | Country | Date |
|---|---|---|
| 26,276 | Great Britain | Dec. 4, 1908 |